United States Patent [19]

Layne

[11] Patent Number: 5,911,305
[45] Date of Patent: Jun. 15, 1999

[54] ENDLESS LOOP MODULAR CONVEYOR SYSTEM WITH DRIVE SCREW

[75] Inventor: James L. Layne, Scottsville, Ky.

[73] Assignee: Span Tech Corporation, Glasgow, Ky.

[21] Appl. No.: 08/754,342

[22] Filed: Nov. 22, 1996

[51] Int. Cl.⁶ .......................... B65G 23/00; B65G 17/06; B65G 23/24
[52] U.S. Cl. .......................... 198/832; 198/852; 198/835
[58] Field of Search .................................. 198/832, 852, 198/853

[56] References Cited

U.S. PATENT DOCUMENTS

| Re. 30,341 | 7/1980 | Lapeyre . |
| 2,223,639 | 12/1940 | Ponder . |
| 3,002,604 | 10/1961 | Brems . |
| 3,493,097 | 2/1970 | Karr . |
| 4,249,838 | 2/1981 | Harvey et al. . |
| 4,476,974 | 10/1984 | Bradbury . |
| 4,650,066 | 3/1987 | Bradbury . |
| 4,953,693 | 9/1990 | Draebel . |
| 5,020,656 | 6/1991 | Faulkner | 198/853 |
| 5,031,757 | 7/1991 | Draebel et al. | 198/852 |
| 5,076,422 | 12/1991 | Clopton . |
| 5,176,240 | 1/1993 | Harris . |
| 5,339,946 | 8/1994 | Faulkner et al. | 198/853 |
| 5,413,211 | 5/1995 | Faulkner | 198/853 |

FOREIGN PATENT DOCUMENTS 2015801  10/1971  Germany ................................ 198/832

*Primary Examiner*—William E. Terrell
*Assistant Examiner*—Joe Dillon, Jr.
*Attorney, Agent, or Firm*—King and Schickli

[57] ABSTRACT

A conveyor system is provided including a modular link conveyor belt forming an endless loop and requiring no inverted return run. The conveyor belt is comprised of a plurality of modular links with at least one of the modular links having an angled cleat depending downwardly therefrom. A screw driving means is provided for engaging the angled cleat(s). Specifically, the screw driving means includes a screw having a thread wherein the thread advantageously engages the angled cleat(s) for providing a positive driving force to the conveyor belt.

4 Claims, 5 Drawing Sheets

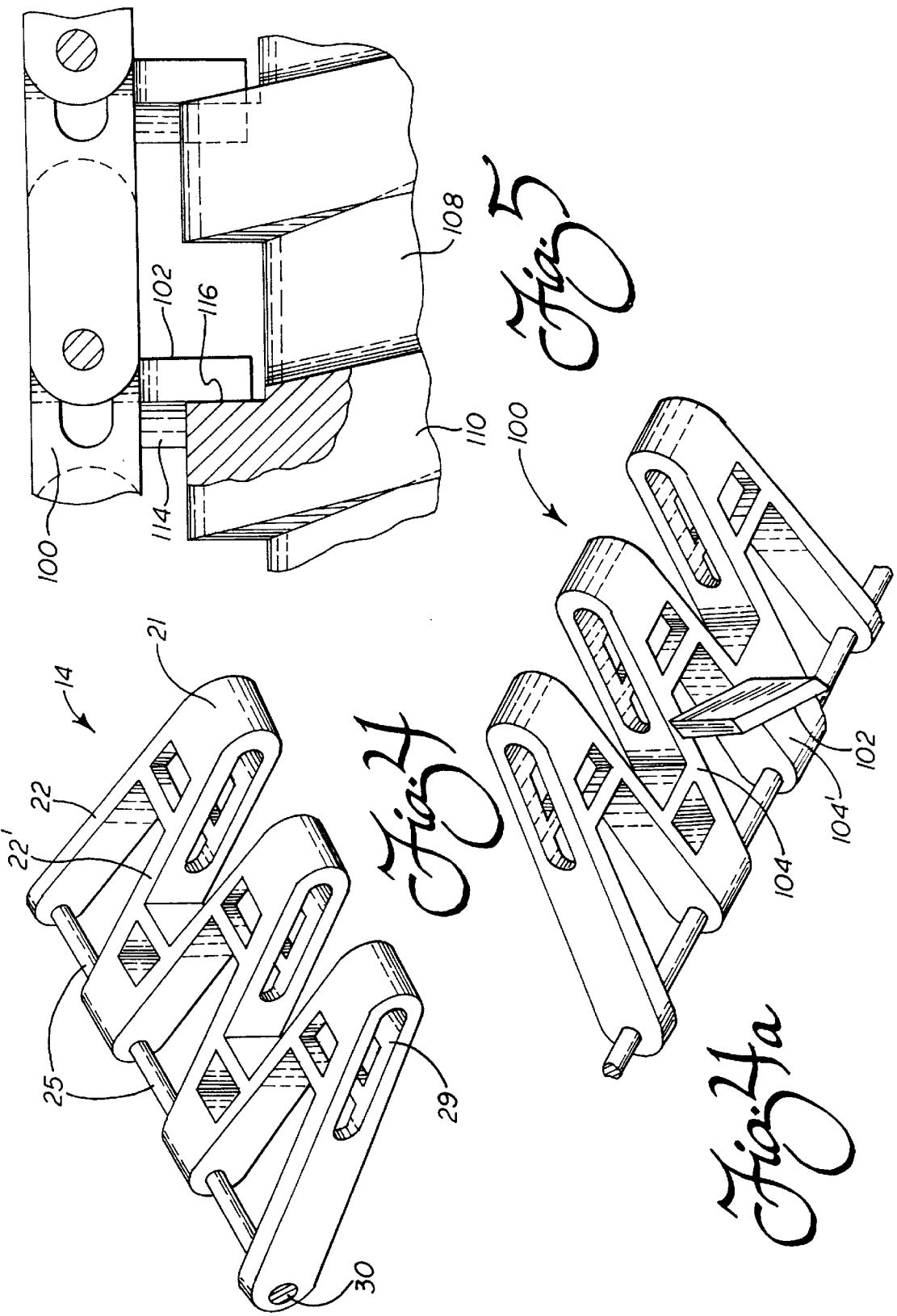

ENDLESS LOOP MODULAR CONVEYOR SYSTEM WITH DRIVE SCREW

TECHNICAL FIELD

The present invention relates generally to modular conveyor systems for moving articles or products along a path, and, more particularly, to an improvement comprising the provision of an endless loop, continuous conveying surface requiring no inverted return run and employing a drive screw type driving means.

BACKGROUND OF THE INVENTION

In many modern industrial settings, modular conveyor systems are extensively utilized for transporting articles to and from various work stations during all stages of production. During the past several years, manufacturers and producers using production lines with modular conveyors as an integral component of the material handling system have realized reasonably significant gains in productivity and resource utilization. Accordingly, modular conveyor systems have become even more widely adopted in the industry, and have been adapted to meet an even wider scope of the material handling needs of producers of a multitude of consumer and industrial products, especially in the food processing sector.

Notwithstanding recent developments and advancements in modular conveyor system design, further improvements in material handling efficiency are desired. For example, because of the nature of the standard conveyor drivers utilized in modular conveyor systems developed to date, the entire surface area of a conveyor belt cannot be used as an uninterrupted conveying surface. Specifically, designers of most prior art conveyor systems have not been able to develop and implement a commercially successful endless material handling conveyor loop that requires no inverted return run. In essence, none of the successful prior art systems provide a conveyor system having the capability of utilizing more than roughly half of the available conveying surface at any given time during operation.

In order to provide the requisite driving force to a conveyor belt, most prior art modular conveyor system drive means include some form of sprocket driving assembly. One example of a conveyor driving system of this type is disclosed in the expired U.S. Pat. No. 3,724,285 to Lapeyre. A later U.S. Pat. No. 4,953,693 to Draebel, owned by the assignee of the present invention, illustrates a significant advance in the structure of the modular conveyor components of this type of conveyor system. However the Draebel '693 patent retains the typical conveyor drive system; i.e. one or more driving sprockets mounted on a drive shaft at one end and an idler sprocket and shaft at the other end. As clearly shown in FIG. 11, this arrangement still suffers the disadvantage of requiring an inverted return run of the conveyor, thus rendering approximately one-half of the conveyor structure unusable at any given time. This not only increases the cost involved in such a conveyor system, but also significantly increases the power required to drive the conveyor system.

There are several other key disadvantages that have been realized with regard to having to provide a such a return run. Specifically, it is not uncommon in the prior art to have to mount the frame for the return run separately from the main conveyor frame that supports the forward or operative run of the belt. This further increases the complexity of the design and also significantly adds to the conveyor system's initial construction costs, as well as the installation cost and later maintenance expenses.

Another key disadvantage of the forward and return feed arrangement is the requirement to provide separate transfer zones to couple two or more conveyors together to make a complete run, such as a full endless conveyor loop. This requires special design of transfer plates, including in many instances idlers or powered transfer rollers. Again a significant additional expense is represented. Furthermore, these transfer zones simply do not work very well, sometimes causing articles, such as soft packages or food products, being transported to hang up or even jam, thus causing a shutdown of the entire system. Even when working properly, there can be a tendency for such articles being transported to backup at the end of the forward run as the articles temporarily slow as they negotiate the transition.

Thus, it is clear that a need exists for a conveyor system with improved material handling capabilities that includes an endless horizontal loop conveyor belt providing an uninterrupted conveying surface and requiring no return run. Such a conveyor system would not need transfer zones with plates and rollers, and would not experience resultant end-of-conveyor slow down of articles, and associated article backup. Such a conveyor system would be capable of transporting articles along an uninterrupted continuous flow path. The system would also be capable of being sufficiently flexible to accommodate the transportation of articles of different hardness, textures, sizes and/or shapes. Further, such a conveyor system would be able to provide for the transport of articles in an economically more efficient, smoother, more productive and more reliable manner.

An example of where an endless loop conveyor system would prove useful is in the food processing industry, and more particularly in the poultry industry. Poultry products are processed, packaged in trays and/or wrapped in assembly line fashion at stations spaced around the loop.

SUMMARY OF THR INVENTION

It is therefore a primary object of the present invention to overcome the above described limitations and disadvantages in the conveyor material handling art.

An additional object of the invention is to provide a conveyor system that transports articles along an uninterrupted looped flow path with an increased economic and operational efficiency.

Yet another object of the invention is to provide a conveyor system that is capable of transporting articles around a flow path forming a closed loop without the use of transfer zones.

Still another object of the invention is to provide a conveyor system including an endless belt requiring no inverted return run, and thus capable of utilizing its entire continuous surface area for article transport.

Yet another object of the invention is to provide a reliable and efficient means to transport articles of various shapes and sizes around an endless loop characterized by full flexibility and adaptability to changing article handling needs.

Another object of the present invention is to provide a conveyor system having a driving means capable of providing exceptionally smooth driving of a conveyor belt which results in increased operation efficiency being realized as a result of the driving means.

Yet another object of the present invention is to provide a drive screw type driving means for positively driving a horizontally disposed endless loop conveyor belt; the conveyor belt being comprised of a plurality of modular links with at least one of the modular links having an angled cleat depending downwardly therefrom for engagement with a threaded screw portion of the drive screw type driving means.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a modular link conveyor system with drive screw type driving means is provided to effect a reliable and efficient means for transporting a variety of articles on a conveyor. The invention disclosed can be used in a wide range of article handling applications, and is especially desirable in those manufacturing, production, or processing situations where it is necessary to transport articles in a continuous loop configuration to and from various work stations or processing locations.

The conveyor system generally includes a conveyor belt comprising a plurality of modular links, with at least one of the modular links having an angled cleat depending downwardly therefrom. In addition, the conveyor belt is preferably horizontally disposed in a loop or endless configuration defining the desired handling path, and specifically providing a continuous and uninterrupted conveying path for article transport thereon.

More particularly, the conveyor belt is generally formed by a plurality of interconnecting modular links. Such a modular conveyor arrangement is disclosed in, for example, the U.S. Patent '693 to Draebel, mentioned above. The disclosure of this patent, as it pertains to the structure of the conveyor belt and the associated modular links is incorporated herein by reference.

The conveyor system further includes a screw driving means for providing the positive driving force to the conveyor belt. More specifically, the screw driving means includes a screw having a thread. The screw is positioned in such a manner so that the thread extends upwardly toward the bottom surface of the conveyor belt. Advantageously, this allows the thread to mate with the depending cleat for applying a driving force to the conveyor belt.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings:

FIG. 4 is an enlarged perspective view of the substantially identical composite modular links which comprise the conveyor belt;

FIG. 4a is an enlarged bottom perspective view of a typical modular link having an angled cleat depending therefrom;

FIG. 5 is an enlarged side view showing a cut away portion of the drive screw and its engagement with the angled cleat;

Reference will now be made in detail to the present preferred embodiment of the invention, an example of which is illustrated in the accompanying drawings.

DETAILED DESCRIPTION OF THE PREFERRED EMBODIMENT

Figure 1:
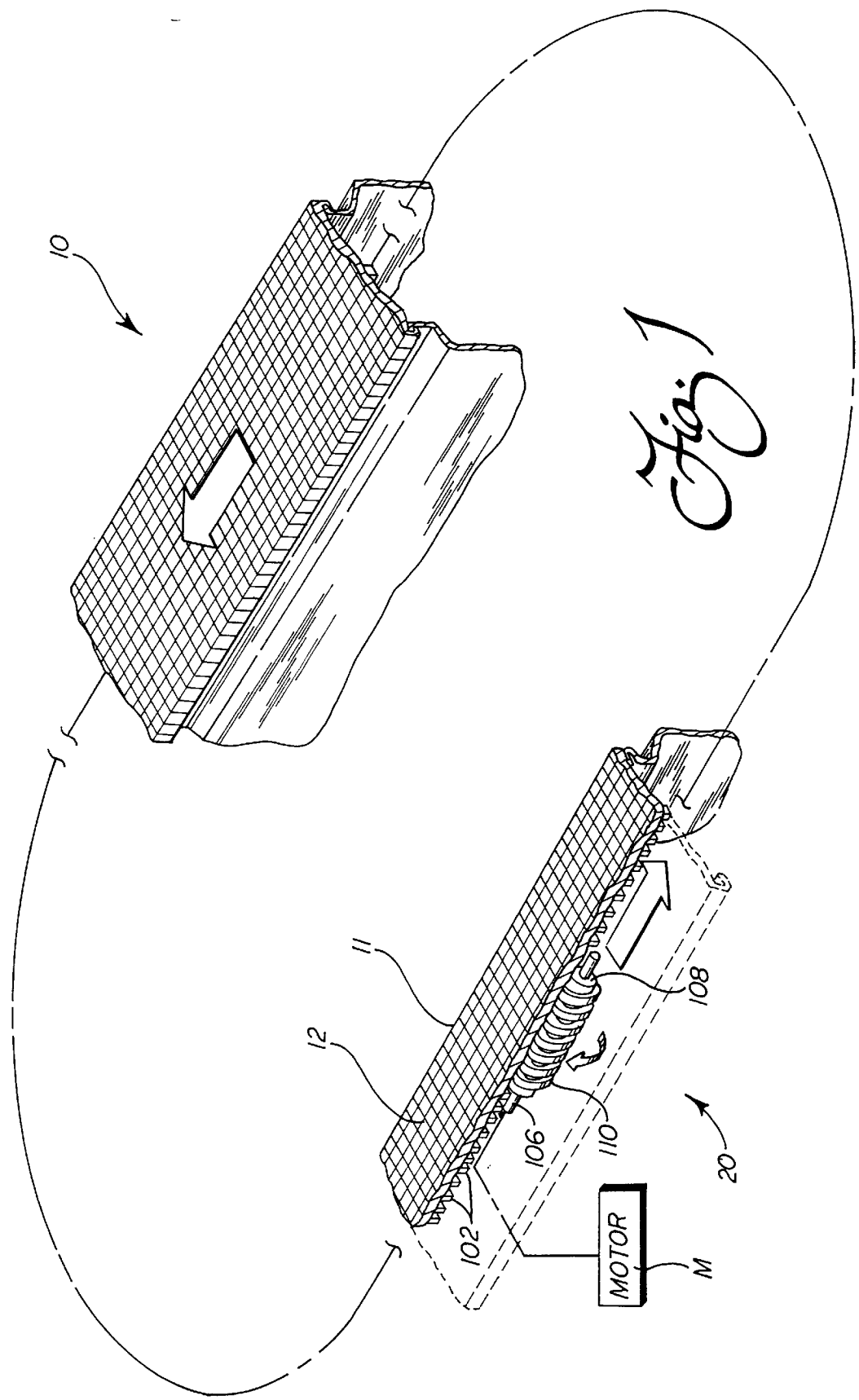
FIG. 1 is a cut away perspective view showing in a broad fashion the endless loop conveyor system with screw driving means of the present invention.

Reference is now made to FIG. 1 illustrating the endless loop conveyor system 10 with a screw driving means 20 incorporating the principles of the present invention. As will become apparent by reviewing the description below, the endless loop conveyor system 10 provides an effective means for transporting articles along an uninterrupted, full loop flow path in a smooth, efficient, and reliable manner.

As best shown in FIG. 1, a modular conveyor belt 11 forms the endless conveying loop (part broken away for simplicity). As should be appreciated, the entire conveyor belt 11 is preferably disposed in a horizontal plane and provides a continuous conveying surface 12. Upon further inspection, it can be seen that the total conveying surface 12 of the conveyor belt 11 is at all times available for transporting articles in an endless feed path. Advantageously, this significantly promotes material handling efficiency.

Articles are capable of being transported between various work stations utilizing a minimum length of conveyor belt. Significant operational efficiency is realized because the screw driving means 20 of the present invention provides for exceptionally smooth driving of the conveyor belt 11. The requirement for a inverted return run of the belt is eliminated, thus cutting the power needed, and at the same time assuring a smooth operation of the system. The elimination of transfer zones for the moving of articles from one conveyor to another along the flow path also enhances the efficiency and promotes smoothness.

In the preferred embodiment, and as best shown in FIG. 4, the conveyor belt 11 is comprised of a plurality of substantially identical composite modular links 14. Each link 14 includes tip or apex 21 and pairs of legs 22, 22' extending at an angle therefrom. Transverse connectors 25 are provided to interconnect and retain the links 14 together, thereby forming the modular link conveyor belt 11.

Specifically, the apexes 21 of the links 14 include transversely oriented slots 29 for receiving the connectors. The distal end of each leg 22 includes a transverse hole 30 for also receiving the connector 25. The holes 30 are coaxial such that each connector 25 passes freely through all aligned holes 30 and slots 29. When properly connected, the connectors 25 join the legs 22 of the links 14 in one row with the apexes 21 of the links in the adjacent row. As will be realized, this combination forms the interlocking modular conveyor belt 11.

According to an important aspect of this invention, the conveyor belt 11 is equipped with a special shaped modular center link 100 having an angled depending cleat 102, as best shown in the bottom perspective view of FIG. 4a. The depending cleat 102 is positioned at an approximately 45° angle on the underside of the link 100 spanning across legs 104, 104'.

Figure 7:
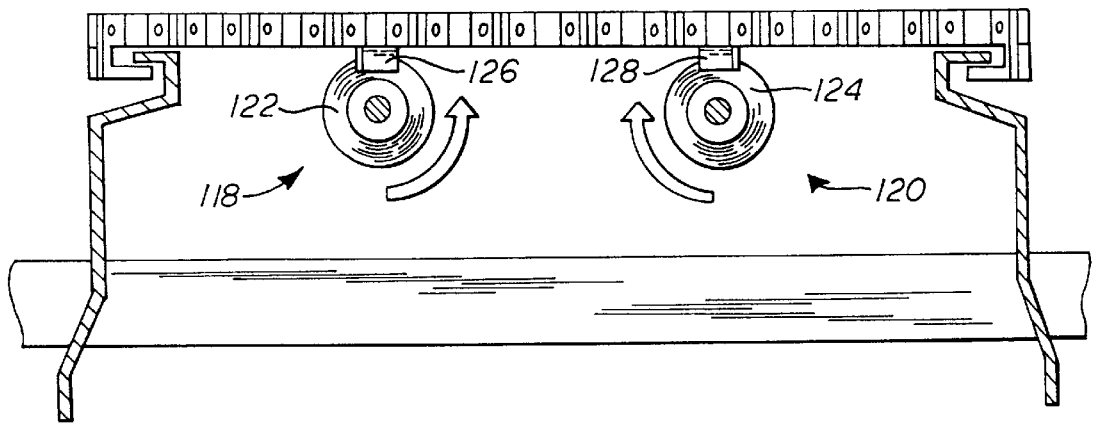
FIG. 7 is an end view showing an alternate embodiment wherein dual screw driving means are utilized for providing a positive driving force to the conveyor belt.

The preferred embodiment described herein uses the center link 100 having a single depending cleat 102 for illustrative purposes only, and it should be appreciated that single or multiple depending cleats could be positioned on various links across the width of the conveyor belt 11, if desired (see, for example, FIG. 7).

Figure 2:
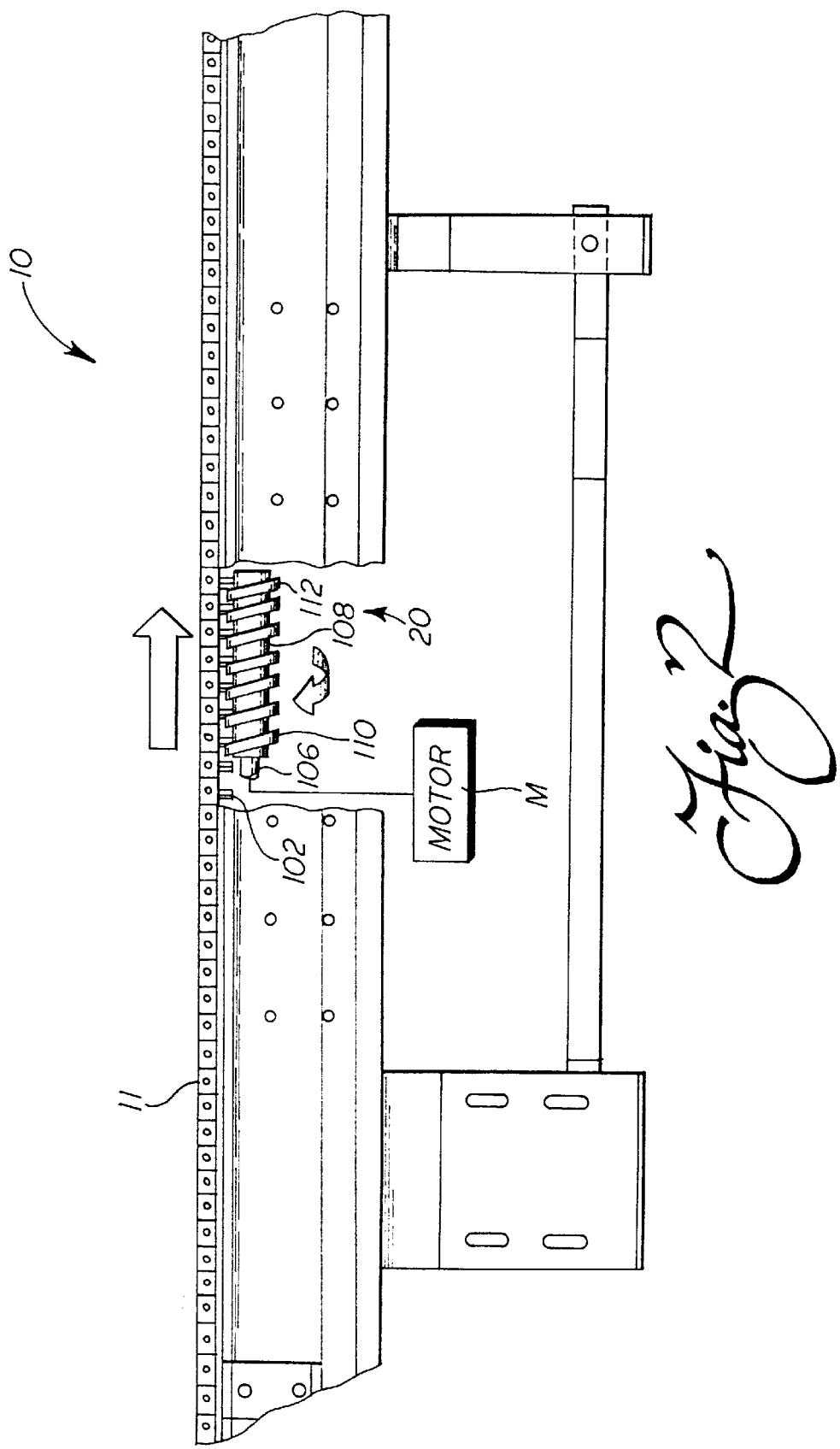
FIG. 2 is a side view showing the screw driving means engaging a section of the conveyor belt of the present invention.
Figure 3:
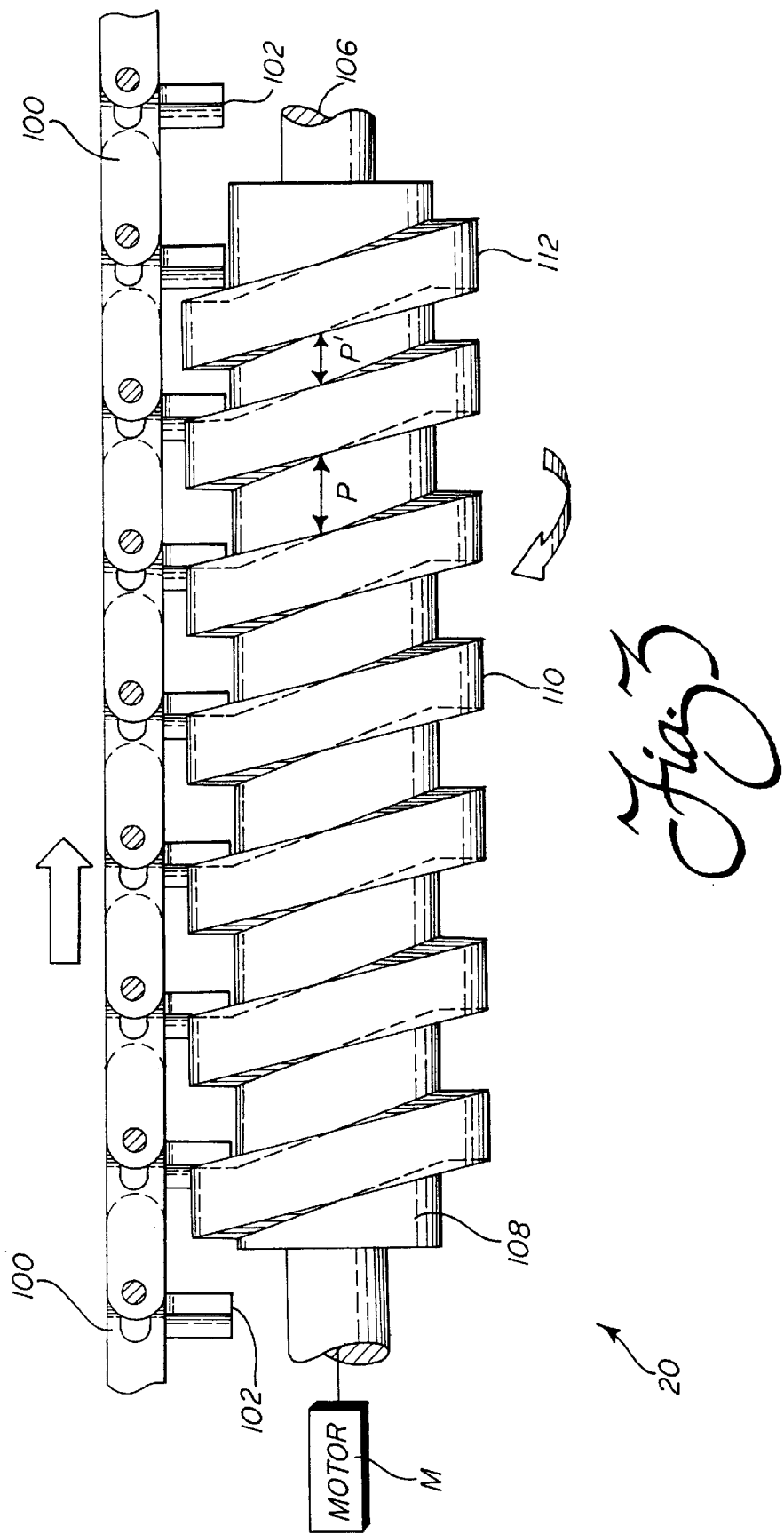
FIG. 3 is a side view showing in more detail the engagement of the drive screw with the angled cleats which depend downwardly from the bottom of the modular links.

Furthermore, screw driving means 20 is mounted beneath the conveyor belt 11 and includes a drive shaft 106 and a screw 108 having a thread 110 (see FIGS. 1 & 2). As can be seen in FIGS. 2 and 3, the screw 108 is positioned in such a manner so that thread 110 extends upwardly toward the bottom surface of conveyor belt 11. More particularly, the thread 110 has an approximately 45° lead angle and mates with the depending cleats 102 for applying a driving force to conveyor belt 11. An electrical motor M provides the driving force to the shaft 106.

As best shown in FIG. 5, the depending cleat 102 is angled so that its rear face 114 is substantially parallel to the front driving face 116 of the thread 110. This allows for transfer of a smooth, continuous driving engagement. This in turn translates into maintenance of a steady conveying surface 12 during operation so that the articles are transported in an efficient and reliable manner.

In addition, and as best shown in FIG. 4a, the lateral edges of the depending cleats 102 are preferably tapered. These tapered edges contribute to the smooth, uninterrupted engagement and disengagement with thread 110 during operation. The thread 110 continuously engages successive depending cleats 102 as the conveyor belt 11 is pushed forward. As a result of this advantageous thread 110 and depending cleat 102 relationship, the conveyor belt 11 is driven forward to effect article movement in a smooth and efficient manner.

As a further means to provide a smooth and efficient conveyor operation, FIG. 3 best shows that the pitch P of thread 110 is gradually reduced to pitch P' near the distal end 112. This pitch reduction provides for a smooth, uninterrupted exit or disengagement of the thread 110 from the depending cleats 102. In addition, the gradual pitch reduction allows for a gradual reduction in the pulling force at the distal end 112 of the thread 110 further enhancing the smooth operation in this area where the modular links 100 are no longer under full tension from the screw driving means 20.

Several operational benefits are realized by driving the conveyor belt 11 by means of the described screw driving means 20. First, the conveyor belt 11 does not require both forward and return runs, as is common in prior art sprocket driven conveyor systems. Accordingly, the conveyor system 10 of the present invention is less expensive all around. Secondly, it requires less power to drive, generally operates smoother and more efficiently and does not experience the problems of excessive wear. Thirdly, the conveyor system 10 of the present invention eliminates the need for utilizing transfer zones between separate conveyors in order to provide an endless loop and continuous conveying surface.

As best shown in FIGS. 1 and 2, the screw driving means 20 preferably engages a plurality of cleats 102 over an extended length of the conveyor belt 11. Accordingly, each and every depending cleat 102 bears a portion of the stress and loading associated with conveyor system operation. This necessarily alleviates a substantial amount of the associated strain at the driving interface of the conveyor belt 11. Accordingly, because of this efficient means of extending and evenly distributing the conveyor loading, reduced component strain and longer conveyor life, as well as a smoother, more even and predictable operation is realized.

Figure 6:
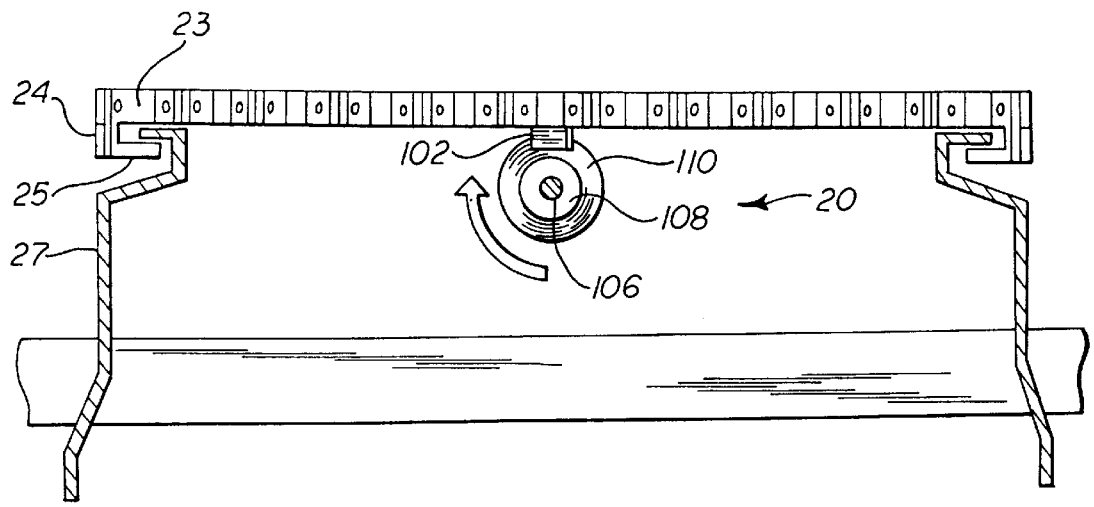
FIG. 6 is an end view showing the positioning of the screw driving means in relation to the conveyor belt for the preferred embodiment of the present invention.

As best shown in FIG. 6, guide rails 27 are provided to support and guide the conveyor belt 11. A plurality of side links 23 on the belt 11 are provided with depending arms 24 for locating and guiding the belt 11 along the corresponding guide rails 27. Advantageously, the side links 23 are provided with transversely extending tabs 25 at the distal end of the depending arms 24 to further maintain the position of the conveyor belt 11.

As mentioned above, more than one driving means 20 may be used. Thus, as shown in FIG. 7, an alternate embodiment is provided utilizing dual screw driving means 118, 120. The screw threads have opposite leads and are driven in opposite directions (as shown by the directional arrows). As shown, each thread 122, 124 engages the depending cleats 126, 128, respectively, on different rows of links. The depending cleats 126, 128 on the engaged links are angled and positioned in an opposite manner so as to accommodate the rotational direction of the mating threads 122, 124. Advantageously, in this alternate embodiment the lateral force vectors cancel each other to enhance the smooth operation of the conveyor system.

In summary, numerous benefits have been described which result from employing the concepts of the invention. The conveyor system 10 of the present invention exhibits improved material handling capabilities and includes an endless conveyor belt 11 having an uninterrupted conveying surface with no inverted return run. Accordingly, the conveyor system 10 represents an improvement in terms of lower cost, easier installation and less maintenance, as well as smoother and more efficient operation. Finally, the present conveyor system 11 is capable of transporting a wide variety of articles around a full loop with no transfer zones in an economically more efficient, more productive, and more reliable manner.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A modular link conveyor system, comprising:
   a modular conveyor belt forming an endless loop and requiring no inverted return run, said conveyor belt including a plurality of modular links, at least one of said modular links having an angled cleat depending downwardly therefrom;

at least one screw having a thread for driving said belt, said screw being positioned to mate with said angled cleat and said thread including a distal end formed having a gradual reduction in pitch;

drive means to impart motion to said screw;

guide means for guiding said belt;

whereby said gradual reduction in pitch of said thread of said screw provides for uninterrupted disengagement of said thread from said angled cleat.

2. The modular link conveyor system of claim 1, wherein said thread of said screw includes a front driving face and said angled cleat includes a rear face, the front driving face of said thread mating with the rear face of said angled cleat in a substantially parallel fashion, and wherein said angled cleat further includes lateral edges adjacent the rear face, the lateral edges being tapered so as to provide for uninterrupted engagement/disengagement of said angled cleat with said thread.

3. A modular link conveyor system, comprising:

a modular conveyor belt forming an endless loop;

said conveyor belt including a plurality of modular links, said plurality of links extending across the full width of the belt providing side flexing capability, and at least one of said modular links having an angled cleat depending downwardly therefrom;

at least one screw having a thread for driving said belt, said screw being positioned to mate with said angled cleat and said thread including a distal end formed having a gradual reduction in pitch;

a driver to impart motion to said screw;

a guide for guiding said belt;

whereby said gradual reduction in pitch of said thread of said screw provides for uninterrupted disengagement of said thread from said angled cleat.

4. The modular link conveyor system of claim 3, wherein said thread of said screw includes a front driving face and said angled cleat includes a rear face, the front driving face of said thread mating with the rear face of said angled cleat in a substantially parallel fashion, and wherein said angled cleat further includes lateral edges adjacent the rear face, the lateral edges being tapered so as to provide for uninterrupted engagement/disengagement of said angled cleat with said thread.

* * * * *